US006456926B1

(12) United States Patent
Neugärtner

(10) Patent No.: US 6,456,926 B1
(45) Date of Patent: Sep. 24, 2002

(54) METHOD AND DEVICE FOR DETERMINING LOAD IN AN INTERNAL COMBUSTION ENGINE

(75) Inventor: Jörg Neugärtner, Regensburg (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/446,253

(22) PCT Filed: Jun. 16, 1998

(86) PCT No.: PCT/EP98/03621

§ 371 (c)(1), (2), (4) Date: Mar. 21, 2000

(87) PCT Pub. No.: WO98/59161

PCT Pub. Date: Dec. 30, 1998

(30) Foreign Application Priority Data

Jun. 21, 1997 (DE) ........................................ 197 26 485

(51) Int. Cl.$^{7}$ .......................... F02D 41/08; G06G 7/70; G06F 19/00

(52) U.S. Cl. .................. 701/103; 701/115; 123/339.17

(58) Field of Search ....................... 123/339.17; 62/133, 62/228.1, 208, 209, 243, 323.1, 323.3, 323.4; 701/101, 102, 103, 114, 115

(56) References Cited

U.S. PATENT DOCUMENTS 4,694,798 A * 9/1987 Kato et al. ............. 123/339.17
5,027,609 A 7/1991 Yashiki et al. ................ 62/133
5,285,649 A * 2/1994 Yamanaka et al. ..... 123/339.17
5,532,930 A 7/1996 Kako ......................... 701/103
5,586,034 A * 12/1996 Takaba et al. .............. 701/115
5,613,370 A 3/1997 Pichotta ..................... 62/228.1
5,752,387 A * 5/1998 Inagaki et al. ......... 123/339.17
5,826,211 A * 10/1998 Kobayashi .................. 701/115
5,924,296 A * 7/1999 Takano et al. ......... 123/339.17

FOREIGN PATENT DOCUMENTS

| | | |
|---|---|---|
| DE | 3835113 | 4/1989 |
| DE | 3914784 | 11/1990 |
| DE | 4219015 | 12/1992 |
| EP | 0433671 | 6/1991 |
| EP | 06116748 | 8/1994 |

* cited by examiner

*Primary Examiner*—Willis R. Wolfe
(74) *Attorney, Agent, or Firm*—Martin A. Farber

(57) ABSTRACT

A invention at least relates to a method for determining the load on an internal combustion engine of a vehicle, operating parameters of the internal combustion engine being recorded and at least one value representing the load is read from a characteristic diagram as a function of the operating parameters recorded, and for at least one further parameter, which is recorded by a sensor already present in the vehicle and which is not an operating parameter of the internal combustion engine, being taken into account in the determination of the load.

5 Claims, 2 Drawing Sheets

METHOD AND DEVICE FOR DETERMINING LOAD IN AN INTERNAL COMBUSTION ENGINE

FIELD AND BACKGROUND OF THE INVENTION

The invention relates to a method and/or an appliance for determining the load on an internal combustion engine of a vehical, in accordance with the respective features of the preamble to the independent patent claims.

Methods and appliances for determining the load on internal combustion engines of vehicles are known. Thus, in a known method, the air mass flow is determined from a characteristic diagram from the engine speed and the position of a control element (throttle butterfly angle) which determines the power of the internal combustion engine, the load being calculated from the air mass flow read from the characteristic diagram, this air mass flow being used for further open-chain/closed-loop control of the internal combustion engine.

In addition, there are similarly operating methods in which, as the operating parameter of the internal combustion engine, an intake pipe pressure is recorded or the air mass flow may also be directly recorded, in addition to the engine speed. These two methods, which take account of the intake pipe pressure or the air mass flow as the operating parameter, have the disadvantage that these operating parameters have to be provided with their own sensor, which—especially in the mass production of internal combustion engines—represents a substantial cost factor, particularly since these sensors are very expensive. In addition, these additional sensors demand a further assembly outlay and, in addition, contain a fault source because the sensors can fail.

Although, in contrast, the method mentioned first, which takes account of the engine speed and the throttle butterfly angle, is indeed favorable from the cost point of view because it dispenses with a further sensor, it is also associated with inaccuracy disadvantages because it involves an indirect measurement method, in that the association of the measured engine speed and the measured throttle butterfly angle with the air mass flow read from the characteristic diagram is extremely susceptible to error, in that it is only possible to record the load in a very inaccurate, transient manner and in that no account is taken of atmospheric conditions because the air mass flow is determined and stored as a characteristic field, which is plotted against the engine speed and the throttle butterfly angle, during a test bed investigation (test series) at certain constant atmospheric conditions only.

SUMMARY OF THE INVENTION

The invention is therefore based on the object of providing a method and an appliance for determining the load on an internal combustion engine of a vehicle, which method avoids the disadvantages described and supplies an accurate conclusion on the load on the internal combustion engine at reduced assembly and cost outlay.

The recording of at least one further parameter, which is not an operating parameter of the internal combustion engine, and subsequently taking account of it during the load determination has the advantage of correcting the values read from the characteristic diagram as a function of the operating parameters of the internal combustion engine, which values represent the load on the internal combustion engine or from which the load on the internal combustion engine can be calculated, by further parameters, such as, for example, atmospheric conditions (for example air pressure and air temperature) in order to carry out the correction rapidly and at favorable cost and to determine a very accurate value for the actual load on the internal combustion engine.

It is, furthermore, advantageous for the further parameter to be recorded by a sensor already present in the vehicle so that, in consequence, it is possible to dispense with an extra sensor for recording the further parameter. This reduces the assembly outlay, the spare parts holding and the fault susceptibility because there is at least one less sensor present which can fail. In addition, the whole of the wiring for such an extra sensor is dispensed with so that, in consequence, weight savings are also possible. The current measurement of the further parameter is transmitted to the control device via a data line, in particular a CAN bus. The sensor, which is configured as a pressure and/or temperature sensor, is—for example—a constituent part of an air-conditioning installation for regulating the shut-off of the air-conditioning installation of the vehicle, a constituent part of a tank system for recording leaks in a tank of the vehicle or even part of a pneumatically operated central locking installation, i.e. use is made of the effect of transferring sensors present in other control devices to yet other control devices, which can then use this measurement for its own tasks.

In consequence, the method according to the invention has the additional advantages that the atmospheric conditions are present immediately on starting the internal combustion engine and the load can therefore be corrected as a function of these conditions. This is then of particular advantage should the atmospheric conditions depart substantially from the conditions on which the test bed investigation was based. Furthermore, it is not only the air mass flow read from the characteristic diagram which can be corrected as a function of the further parameters, it is also possible to correct further operating parameters (for example, more precise determination of the intake pipe pressure) and also to specify or correct specified pilot control values for the lambda control or idling control, for example.

Appliances are, furthermore, provided which can, for example, be used for carrying out the method according to the invention, to which appliances, however, the method is not limited.

BRIEF DESCRIPTION OF THE DRAWINGS

These appliances are described below and explained using the figures of the drawings wherein.

DETAILED DESCRIPTION OF THE PREFERRED EMBODIMENT

Figure 1:
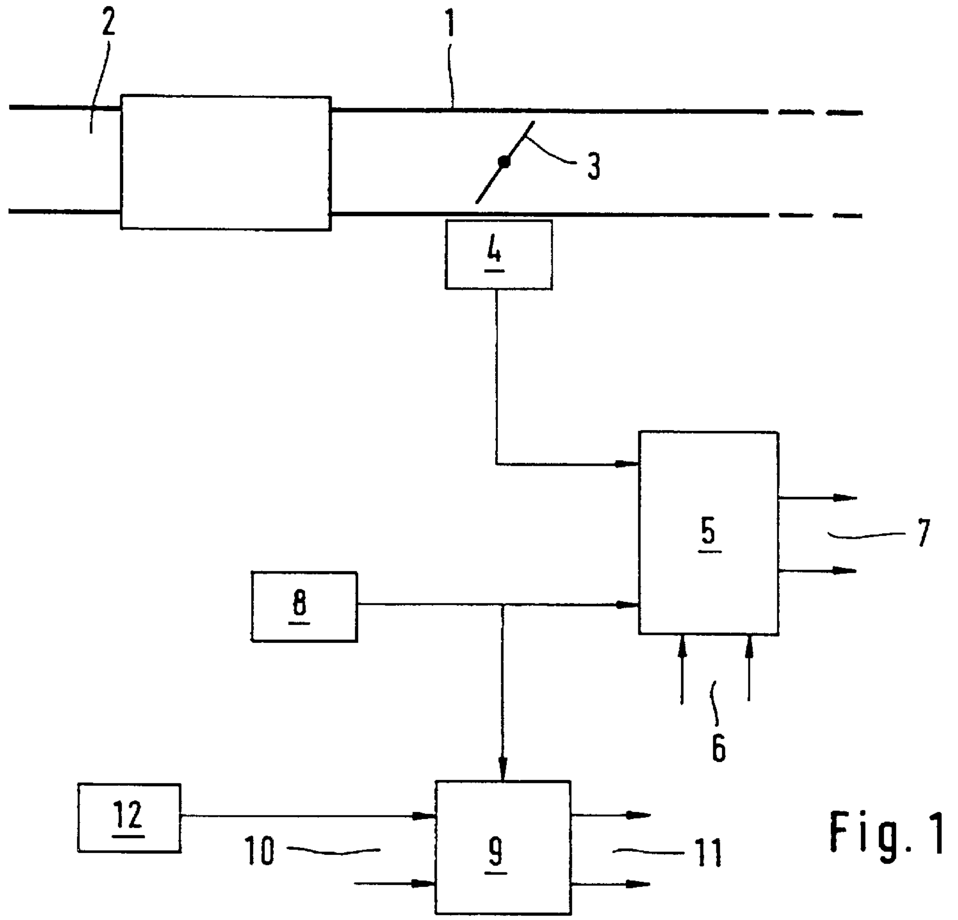
FIG. 1 shows an appliance with a pressure sensor already present in the vehicle.

FIG. 1 shows an appliance, for carrying out the method, which has a pressure sensor which is already present in the vehicle but is not configured for recording operating parameters of an internal combustion engine arranged in the vehicle. The intake trunking is represented by an intake pipe 1 with an air filter which, in known manner, has an air inlet region 2, the air flowing from the air inlet region 2 into the air filter reaching the intake pipe 1. A throttle butterfly 3 is arranged behind the air filter. A position sensor 4 is provided for measuring the position of the throttle butterfly 3 and its output signal is supplied to a control device 5. This position sensor 4 is absolutely necessary for the control of the operation of the internal combustion engine and is therefore present. The invention is preferably applicable to spark-ignition engines with throttle butterfly but it can also be operated with other control elements for adjusting the power of the internal combustion engine and also in the case of diesel engines.

Further input parameters 6 (such as the engine speed of the internal combustion engine and further operating parameters and, if appropriate, environmental parameters) are supplied to the control device 5, output signals 7—at least on the basis of the output signal of the position sensor 4 and the further input parameters 6—being generated which activate, for example, the injection device of the internal combustion engine.

The atmospheric pressure is recorded by a pressure sensor 8 already present in the vehicle, this pressure sensor 8 transmitting the atmospheric pressure to, for example, an air-conditioning control unit 9. The air-conditioning control unit 9 generates output signals 11, as a function of the atmospheric pressure recorded by the pressure sensor 8 and other input parameters 10, to control the operation of the air-conditioning installation. The air-conditioning control unit 9 is, in addition, connected to a temperature sensor 12. In this way, the pressure sensor 8, which is also connected to the control device 5 but is actually associated with the air-conditioning control unit 9, is used to measure the atmospheric pressure, thus dispensing with a separate sensor. For this purpose, the control device 5 is configured to determine a load of the internal combustion engine, at least from the output signals of the position sensor 4 and of the engine speed sensor (not shown in any more detail), and to correct this load as a function of the output signal of the pressure sensor 8 (and, if appropriate, of the temperature sensor 12).

Figure 2:
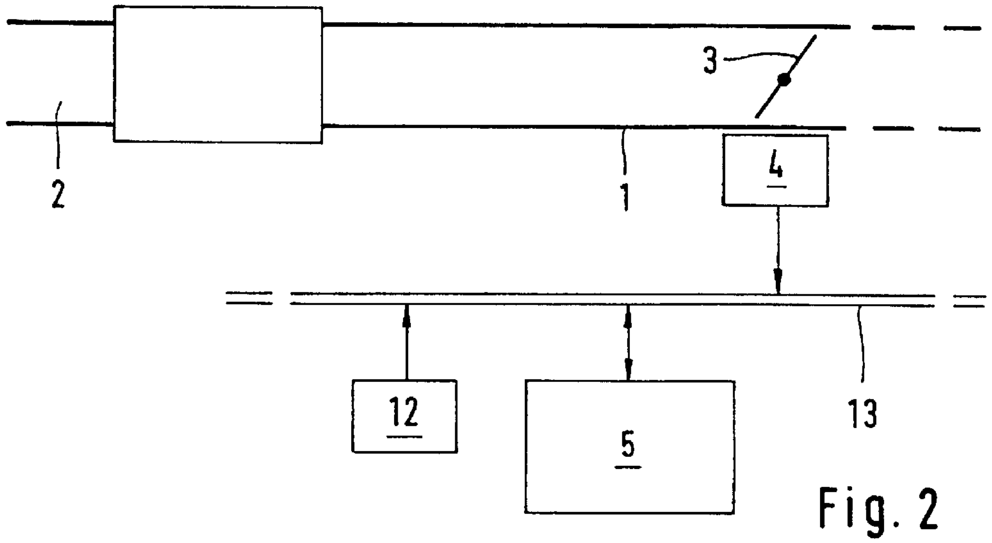
FIG. 2 shows an appliance with a data line.

FIG. 2 shows an appliance for carrying out the method, the output signals of the sensors 4 and 12, at least, being transmitted via a data line 13 to the control device 5. Further sensors and/or control units can be connected to the data line 13, it being possible to supply at least the output signals of the sensors 4 and/or 12 to the additionally connected control units or a part of them.

Attention is also drawn to the fact that the pressure sensor 8 shown in FIG. 1 can also be connected to the data line 13 so that the control device 5 receives at least the output signals of the pressure sensor 8 via the data line 14. In addition, the air-conditioning control unit 9 can also receive the output signal of the pressure sensor 8 and/or of the temperature sensor 12 via the data line 14. It is also conceivable that the pressure sensor 8 should be associated with a tank system of the vehicle in order to record the atmospheric pressure. The use of an absolute pressure sensor and an unpressurized operating condition (venting) of the tank is then necessary.

Figure 3:
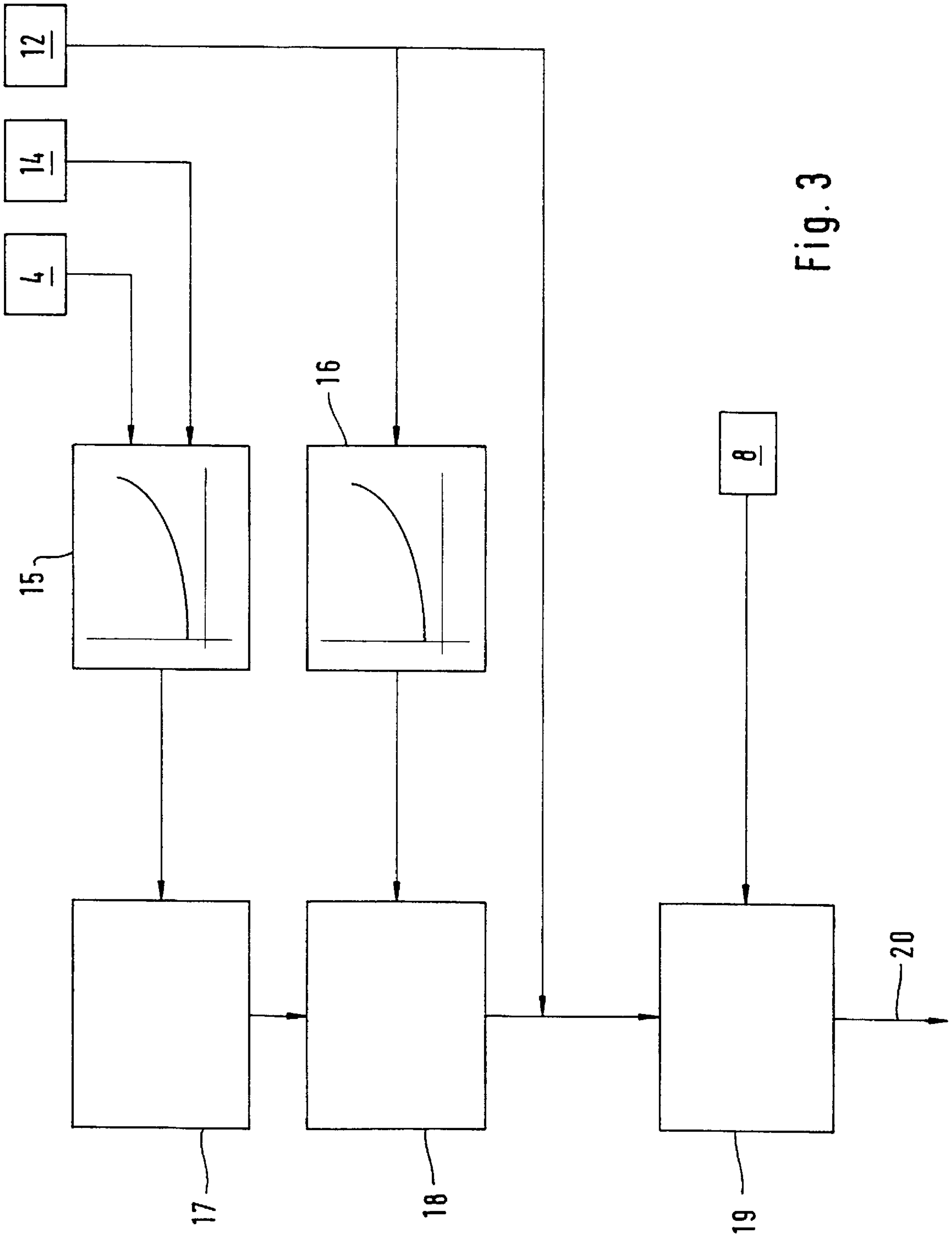
FIG. 3 shows, at least partially, the arrangement of the constituents of the control device.

FIG. 3 shows, at least partially, the arrangement of the constituents of the control device 5. An engine speed sensor 14 is shown as a supplement to the sensors already shown in FIGS. 1 and 2 and which are also present in the control device 5 of FIGS. 1 and 2, the output signal of the position sensor 4 and the engine speed sensor 14 being supplied to a first characteristic diagram 15. The output signal of the temperature sensor 12 is supplied to a second characteristic diagram 16, a different association between the output signals of the sensors and the respective characteristic diagrams also being conceivable. A calculation 17 of a basic load is carried out by means of the value read from the characteristic diagram 15, a calculation 18 of a load corrected as a function of the temperature being carried out on the basis of the value read from the characteristic diagram 16. Instead of two characteristic diagrams 15 and 16, it is also conceivable to use multi-dimensional characteristic diagrams by means of which the basic load, and, immediately thereafter, the corrected load, can be corrected. If the corrected load is available, a calculation 19 of a recorrected load still follows, this recorrected load being corrected as a function of the output signal of the further sensor (pressure sensor 8), which is supplied to the control device 5 via the data line 13. At the end of this procedure, therefore, an output signal 20 is available which has been calculated on the basis of the engine speed and the throttle butterfly angle and which has been corrected as a function of the atmospheric conditions (air pressure and air temperature). This output signal 20 can then be further processed in the control device 5 and/or can be made directly available to the control device 5 via the outputs 7 for further processing. Referring to FIG. 2, it is therefore possible for input signals to be supplied to the control device 5 and also for the values present or calculated in the control device 5 to be output via the data line 13.

List of Designations

1. Intake pipe with air filter
2. Air inlet region
3. Throttle butterfly
4. Position sensor
5. Control device
6. Further input parameters
7. Output signals
8. Pressure sensor
9. Air-conditioning control unit
10. Further input parameters
11. Output signals
12. Temperature sensor
13. Data line
14. Engine speed sensor
15. Characteristic diagram
16. Characteristic diagram
17. Calculation of a basic load
18. Calculation of a corrected load
19. Calculation of a recorrected load
20. Output signal

I claim:

1. Apparatus for determining the load on an internal combustion engine of a vehicle, having sensors for recording operating parameters of the internal combustion engine and a control device connected to the sensors, at least one value representing the engine load being read from a characteristic diagram in the control device for transmission via an output as a function of the operating parameters recorded, wherein a sensor of atmospheric pressure already present in the vehicle for recording at least one further parameter, which parameter is not an operating parameter of the internal combustion engine, is connected to the control device, the further parameter being employed in the determination of the load.

2. The apparatus as claimed in claim 1, wherein the pressure sensor for recording the further parameter is part of a tank system of the vehicle.

3. The appliance as claimed in claim 1, wherein the sensor for recording the further parameter is a temperature sensor (12).

4. The apparatus as claimed in claim 1, wherein the control device (5) is connected at least to one further control device of the vehicle, the further sensor being connected to the further control device.

5. The apparatus as claimed in claim 4, wherein the control device (5) and the at least one further control device are connected to one another via a data line (13), in particular a CAN bus.

* * * * *